(12) United States Patent
Yukawa

(10) Patent No.: US 7,182,114 B2
(45) Date of Patent: Feb. 27, 2007

(54) TIRE NOISE REDUCING SYSTEM

(75) Inventor: Naoki Yukawa, Kobe (JP)

(73) Assignee: Sumitomo Rubber Industries, Ltd, Kobe (JP)

( * ) Notice: Subject to any disclaimer, the term of this patent is extended or adjusted under 35 U.S.C. 154(b) by 51 days.

(21) Appl. No.: 10/922,854

(22) Filed: Aug. 23, 2004

(65) Prior Publication Data

US 2005/0098251 A1 May 12, 2005

(30) Foreign Application Priority Data

Nov. 7, 2003 (JP) .............................. 2003-378764

(51) Int. Cl.
*B60C 5/00* (2006.01)
*B60C 19/00* (2006.01)
(52) U.S. Cl. ..................................... 152/450
(58) Field of Classification Search ............... 152/157, 152/450
See application file for complete search history.

(56) References Cited

U.S. PATENT DOCUMENTS 2,702,769 A * 2/1955 Alderfer .................... 428/157
6,726,289 B2   4/2004 Yukawa et al.
2002/0124921 A1 * 9/2002 Nakajima et al.
2003/0020320 A1 * 1/2003 Yukawa et al.

FOREIGN PATENT DOCUMENTS

| DE | 197 50 229 A1 | 6/1999 | |
|---|---|---|---|
| DE | 198 06 935 A1 | 9/1999 | |
| EP | 1 253 025 A2 | 10/2002 | |
| JP | 62050203 A * | 3/1987 | ................. 152/450 |
| JP | 62216803 A * | 9/1987 | |
| JP | 01 078902 A | 3/1989 | |
| JP | 07 017222 A | 1/1995 | |
| JP | 2002178712 A * | 6/2002 | |
| JP | 2003226104 A * | 8/2003 | |
| WO | WO-03/103989 A1 * | 12/2003 | |

* cited by examiner

*Primary Examiner*—Adrienne C. Johnstone
(74) *Attorney, Agent, or Firm*—Birch, Stewart, Kolasch & Birch, LLP

(57) ABSTRACT

The present invention relates to a tire noise reducing system comprising a pneumatic tire, a wheel rim on which the pneumatic tire is mounted, and a noise damper disposed in a cavity surrounded by an inner surface of the rim and an inner surface of the tire mounted thereon, wherein the noise damper has a volume V2 which is from 0.4 to 20% of the volume V1 of the cavity, and the noise damper is made of a porous material having a hardness of from 10 to 80 N, a tensile strength of not less than 70 kPa and a specific gravity of from 0.014 to 0.026.

10 Claims, 7 Drawing Sheets

TIRE NOISE REDUCING SYSTEM

This Non-provisional application claims priority under 35 U.S.C. § 119(a) on patent application Ser. No(s). 2003-378764 filed in Japan on Nov. 7, 2003, the entire contents of which are hereby incorporated by reference.

BACKGROUND OF THE INVENTION

1. Field of the Invention

The present invention relates to a tire noise reducing system capable of reducing a road noise caused during driving of a vehicle, and more particularly, to a system having a noise damper disposed in a cavity.

2. Description of the Related Art

A road noise is known as one of tire noises. The road noise is a sound around from 50 to 400 Hz generated from a tire running on a road surface. A cause of the road noise is resonance vibrations of air generated in the tire cavity. In recent years, there is proposed a tire noise reducing system comprising a tire (b), a rim (c) on which the tire is mounted, and a noise damper (a) disposed in a cavity surrounded by the tire (b) and the rim (c) as shown in FIG. 8(A).

The noise damper (a) is made of porous material. The noise damper (a) absorbs vibrational energy generated in the tire cavity, suppresses the resonance and reduces the road noise. The noise damper (a) is fixed to the cavity. When the noise damper (a) is not fixed to the tire cavity, the noise damper a collides against the tire (b) or an inner surface of the rim (c) and is destroyed due to a centrifugal force and lateral force when a vehicle runs, and thus it can not suppress the resonance noise. That is, in order to maintain the noise reducing effect for a long term, durability of the noise damper is desired. Even if the noise damper is fixed to the tire cavity, however, the noise damper is damaged in some cases.

SUMMARY OF THE INVENTION

It is a main object of the present invention to provide a tire noise reducing system with high durability capable of preventing a noise damper from being damaged.

The present invention provides a tire noise reducing system comprising:

a pneumatic tire, a wheel rim on which the pneumatic tire is mounted, and a noise damper disposed in a cavity surrounded by an inner surface of the rim and an inner surface of the tire mounted thereon, wherein the noise damper has a volume V2 which is from 0.4 to 20% of the volume V1 of the cavity, and the noise damper is made of a porous material having a hardness of from 10 to 80 N, a tensile strength of not less than 70 kPa and a specific gravity of from 0.014 to 0.026.

It is preferable that the noise damper extends in a circumferential direction of the tire, and at least one of ends thereof in the circumferential direction of the tire is provided with a tapered portion.

BRIEF DESCRIPTION OF THE DRAWINGS

Embodiments of the present invention will now be described in detail in conjunction with the accompanying drawings.

BEST MODE FOR CARRYING OUT THE INVENTION

Figure 1:
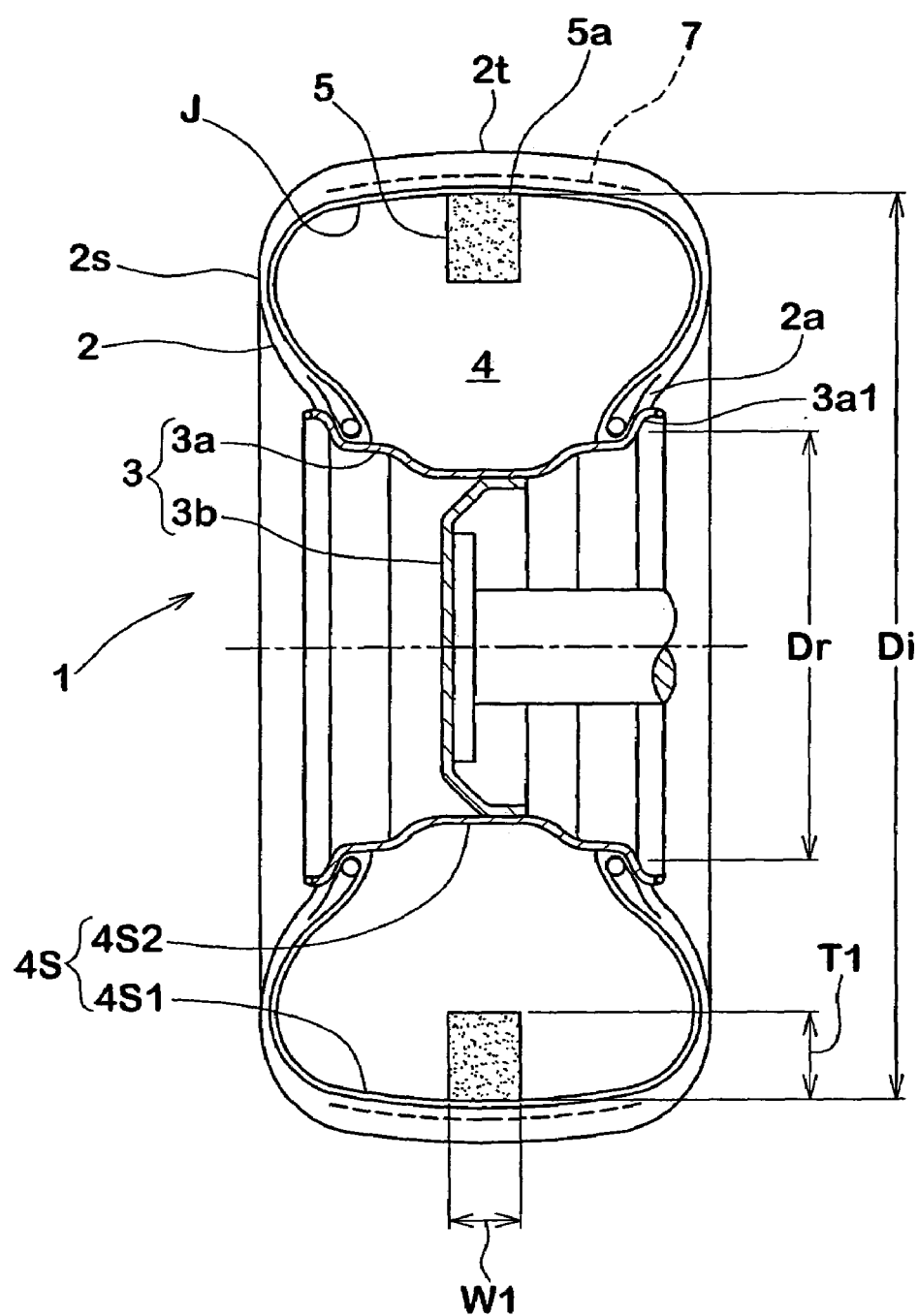
FIG. 1 is a cross sectional view showing an embodiment of a tire and rim assembly of the present invention.
Figure 2:
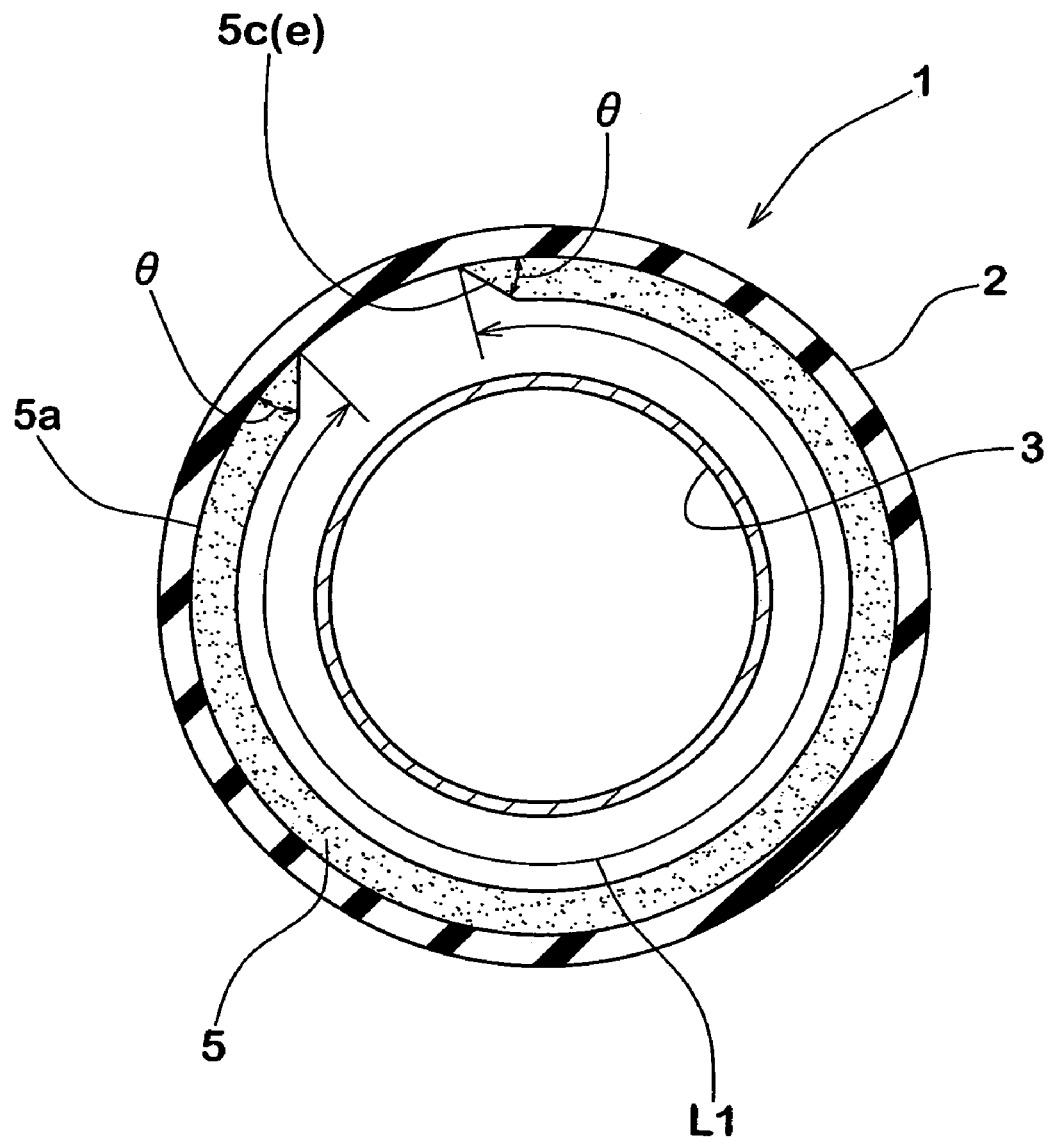
FIG. 2 is a circumferential sectional view of the assembly taken along a tire equator.

A tire noise reducing system 1 of the embodiment comprises a pneumatic tire 2, a wheel rim 3 on which the pneumatic tire is mounted, and a noise damper 5. The noise damper 5 is disposed in a cavity 4 surrounded by an inner surface 4S2 of the rim 3 and an inner surface 4S1 of the pneumatic tire 2 mounted on the wheel rim 3.

The wheel rim 3 comprises a rim 3a on which a tire 2 is mounted, and a disk 3b fixed to the rim 3a. The wheel rim 3 of this embodiment is a normal rim defined by standard of JATMA or the like. The pneumatic tire 2 comprises a tread portion 2t, a pair of bead portions 2a, and a pair of sidewall portions 2s extending therebetween. In this example, the pneumatic tire 2 is a radial tire for a passenger car. An air-non-permeable inner liner rubber is disposed on the inner surface 4S1 of the tire. With this, the cavity 4 becomes an annular continuous hermetical space.

The noise damper 5 is made of porous material and extends long in the circumferential direction of the tire. Here, the porous material means not only a foamed elastomer or plastic of an open-cell or closed-cell type but also shaped intertangled fiber such as synthetic fiber, plant fiber and animal fiber. In the under-mentioned examples, open-cell type poly-urethane foam is used.

The porous material has high vibration isolation ability and sound absorption ability, and efficiently absorbs vibrational energy in the cavity 4. As a result, the resonance is suppressed, and road noise becomes small. The porous material can easily be shrunk, bent and deformed. Therefore, the porous material does not hinder the mounting operation of the pneumatic tire 2 to the wheel rim 3. Since the porous material has a small specific gravity as compared with a solid rubber, the porous material does not deteriorate the weight balance of the tire.

The volume V2 of the noise damper 5 should be at least 0.4% the volume V1 of the cavity 4. Preferably, the volume V2 is set in a range of not less than 1%, more preferably not less than 2%, still preferably not less than 4%, but not more than 20% the volume V1.

In this specification, the expression "volume V2 of the noise damper" means the apparent entire volume of the noise damper including inside bubbles. Further, the volume V1 of the cavity 4 is defined under the normal inflated condition by the following approximate equation:

$$V1 = A \times \{(Di-Dr)/2 + Dr\} \times \pi$$

wherein

"A" is the cross sectional area of the cavity 4,
"Di" is the maximum outer diameter of the cavity 4, and
"Dr" is the wheel rim diameter.

The above-mentioned normal inflated condition is such that the tire 2 is mounted on the wheel rim 3 and inflated to a standard pressure but loaded with no tire load. The standard pressure is the "maximum air pressure" in JATMA, the "Inflation Pressure" in ETRTO, the maximum pressure given in the "Tire Load Limits at Various Cold Inflation Pressures" table in T&RA of the like. In case of passenger car tires, however, 200 kPa is used as the standard pressure.

Figure 3:
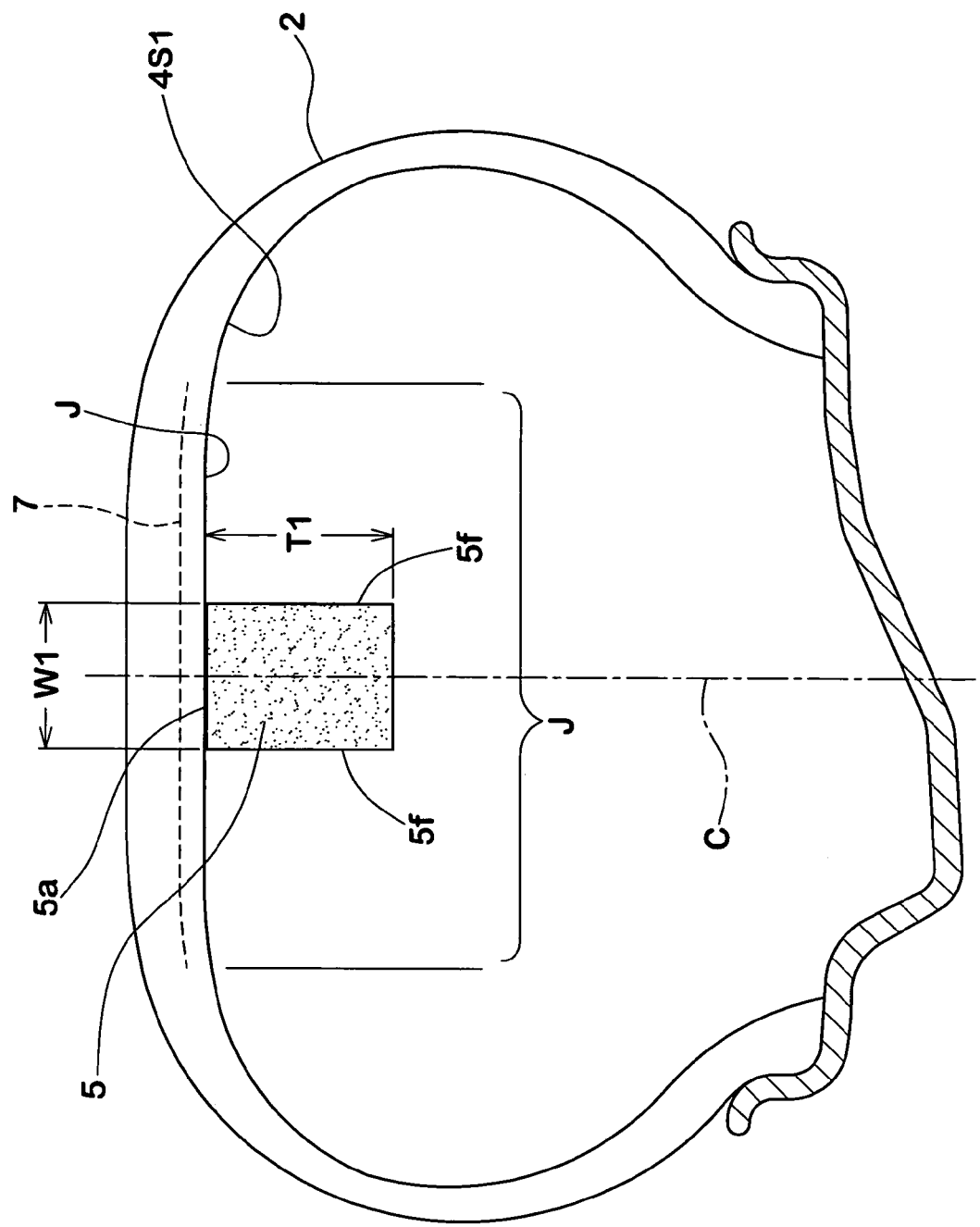
FIG. 3 is an enlarged cross sectional view of the assembly.

The noise damper 5 is fixed to one or both of the inner surface 4S1 of the tire and the inner surface 4S2 of the wheel rim. In this embodiment, as shown in FIG. 3, the bottom surface 5a of the noise damper 5 is fixed to the inner surface 4S1. Preferably, the noise damper 5 is fixed to a tread region J of the inner surface 4S1 of the tire. The "tread region J" is a region on the inner side of a belt 7. A centrifugal force when the vehicle runs at high speed acts outward in the radial direction of the tire. Thus, the tire 2 and the noise damper 5 fixed to the tread region J are strongly pushed against each other by the centrifugal force, thereby preventing the fixing surface from being peeled off.

Preferably, a width center line of the noise damper 5 and a tire equator C substantially coincide with each other. In a tire cross section, it is preferable that the shape of the noise damper 5 is symmetrical centered on the tire equator C. When the cross section shape of the noise damper 5 is asymmetrical, its lateral rigidities are different on the left and right sides, and the noise damper 5 is prone to incline toward a side having a smaller rigidity.

The cross section shape of the noise damper 5 is not especially limited, and rectangular shape, trapezoidal shape, triangular shape, nose shape, semi-circular shape and the like are suitable. A rectangular cross section shape is preferable for the noise damper 5 if the productivity and road noise reducing effect are taken into account. Preferably, in the rectangular shape, a ratio (T1/W1) of the height T1 and the width W1 is not less than 0.4, preferably not less than 0.8, and more preferably not less than 1.0. The ratio (T1/W1) is preferably not more than 2.0, preferably not more than 1.8 and more preferably not more than 1.5.

The noise damper 5 may be fixed to the tire cavity 4 in various methods. An adhesive or a double-sided tape is used for fixing the noise damper 5. It is preferable that the adhesive is a synthetic rubber-based adhesive such as "solution type adhesive in which synthetic rubber is dissolved in organic solution" and "latex type adhesive in which synthetic rubber is dispersed in water."

The double-sided tape may be a sheet base material such as web provided at its both surfaces with adhesive layers, or may be a tape having adhesive layers only without having the sheet base material. The inside temperature of the tire when the vehicle runs at high speed increases to about 120° C. Therefore, it is preferable that the double-sided tape has high peel strength at room temperature and high temperature. More specifically, it is preferable that the peel strength at 25° C. is 0.147 N/mm (0.015 kgf/mm) or higher, and the peel strength at 125° C. is 0.0588 N/mm (0.006 kgf/mm) or higher.

Figure 4:
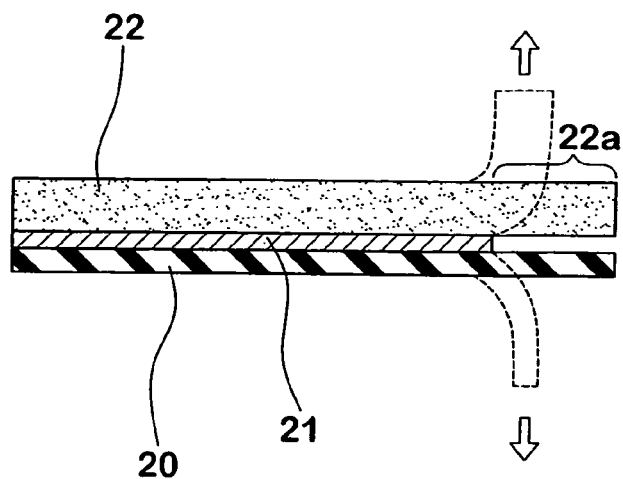
FIG. 4 is a diagram for explaining a peel test.

The peel strength is obtained in the following manner. First, as shown in FIG. 4, a rubber sheet 20 made of the same rubber as that of the inner surface 4S1 of the tire and a porous sheet 22 having the same composition as that of the noise damper 5 are adhered to each other through a double-sided tape 21 to be tested. A cross section of the porous sheet 22 is rectangular having width of 20 mm, thickness of 10 mm and length of 120 mm. One end of both the porous sheet 22 and the rubber sheet 20 in the longitudinal direction are provided with a non-adhesion portion 22a so that they do not adhere to each other. The length of the non-adhesion portion 22a is 20 mm. The non-adhesion portions 22a are pulled in opposite directions using a tensile testing machine, and a pull strength (N) when they are peeled is measured. The peel strength can be obtained by dividing the pull strength by the width 20 mm of the porous sheet 22.

Figure 5:
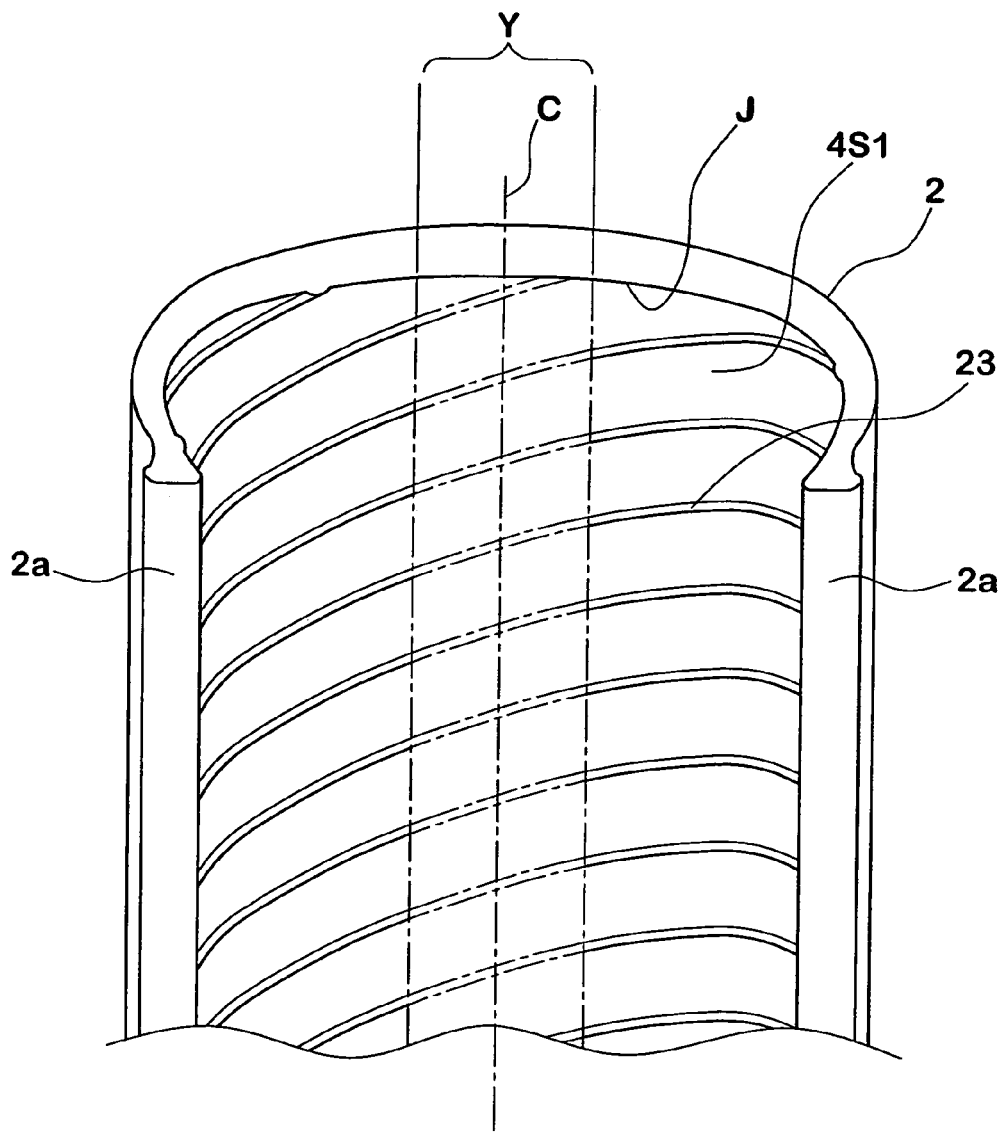
FIG. 5 is a perspective view for explaining a smooth surface in an adhesion region of an inner surface of the tire.

In order to further enhance the adhesion strength between the noise damper 5 and the tire 2, it is preferable to form the adhesion surface of the tire 2 smooth. Generally, a surface of a bladder used when the tire is cured and formed is provided with a plurality of discharging grooves for discharging air between the bladder and the tire. Thus, traces of the discharging grooves as shown in FIG. 5 remains in the inner side surface 4S1 of the tire after it is cured and formed, and the inner surface 4S1 is formed with a plurality of projections 23. Such projections 23 deteriorate the adhesion strength. Thus, it is preferable that the pneumatic tire 2 has no projections 23 at least in an adhesive region Y of the inner surface 4S1. Such a pneumatic tire 2 can be formed using bladder having no discharging grooves in at least the adhesive region Y or can be prepared by removing the projections 23 after cure.

Figure 8A:
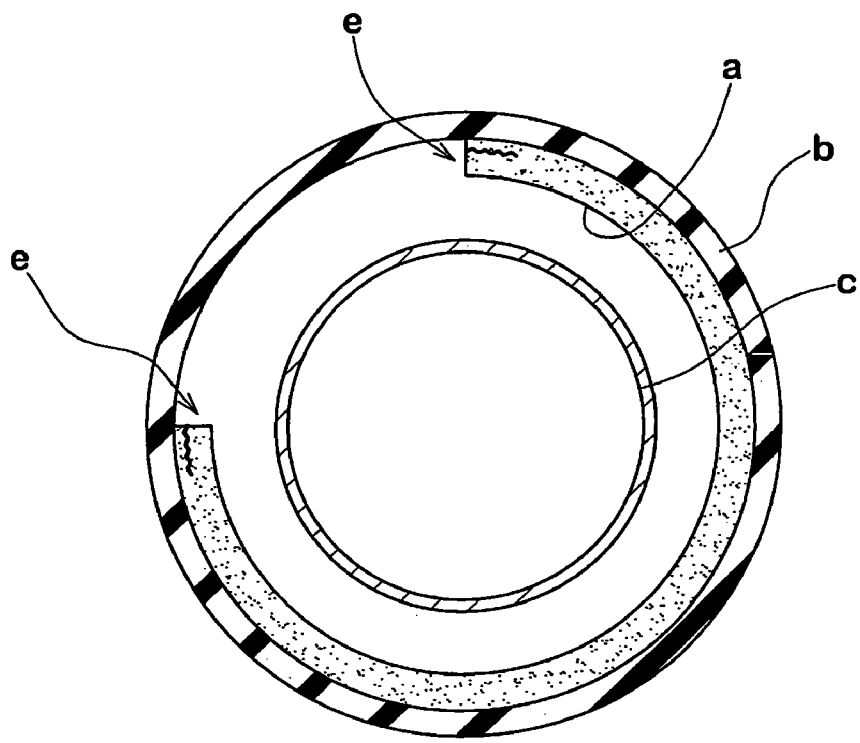
FIG. 8 (A) and (B) are diagrams for explaining prior art.
Figure 8B:
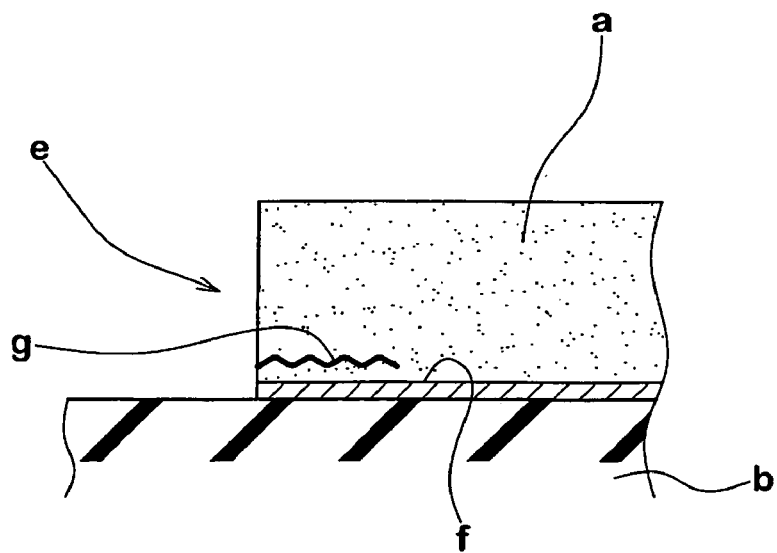

If a durability test is carried out, even if the noise damper 5 is reliably adhered to the cavity 4, the noise damper 5 is damaged in some cases. FIG. 8(B) shows one example of such damage as shown with a symbol (g). The damages (g) intensively appear around an end (e) of the noise damper (a) in the circumferential direction of the tire, and the damages (g) are generated in parallel to the adhesion surface f. In this invention, the noise damper 5 is made of special porous material having a hardness of from 10 to 80 N, a tensile strength of not less than 70 kPa, and a specific gravity of from 0.014 to 0.026, thereby preventing the damages (g).

If the porous material having the hardness of from 10 to 80 N is used for the noise damper 5, the noise damper 5 is flexibly deformed, and stress intensively existing on the adhesion surface (f) is dispersed in a wide range by elongation of the noise damper 5. More preferably, the hardness of the porous material is in a range of from 20 to 50 N. If the hardness of the porous material is less than 10 N, the road noise can not be reduced sufficiently, and if the hardness of the porous material is more than 80 N, above damage is frequently generated in the porous material.

If a porous material having the tensile strength of not less than 70 kPa is used for the noise damper 5, the endurance against the stress can be enhanced. A preferable tensile strength of the porous material is not less than 80 kPa, preferably in not more than 160 kPa and more preferably not more than 120 kPa.

If a porous material having a specific gravity of from 0.014 to 0.026 is used for the noise damper 5, the mass is reduced, and external force toward the noise damper generated by the acceleration can be reduced. This also reduces the stress itself. The damage (g) of the noise damper is suppressed by the synergism, and the durability of the noise damper 5 is largely enhanced. If the specific gravity is excessively small, the road noise can not be reduced sufficiently.

To suppress the damage (g), it is preferable that the elongation when the porous material is ruptured; and tear strength; are determined. The elongation is preferably in a range of from 200 to 600%. The tear strength is preferably in a range of from 5 to 10 N/cm.

Here, the "hardness of the porous material" is determined in accordance with "soft polyurethane foam test method" defined by in paragraph 6.3 of JIS K6400. Further, the "tensile strength of the porous material" and the "elongation when the porous material is ruptured" are values measured for dumbbell test piece of No. 1 in accordance with a measuring method of "tensile strength and elongation" defined by in paragraph 10 of JIS K6400. The specific gravity of the porous material is a value obtained by converting an apparent density measured in accordance with a measuring method of "apparent density" defined by in paragraph 5 of JIS K6400. The "tear strength of the porous material" is a value measured for the test piece of No. 1 in accordance with a measuring method of "tear strength" defined by in paragraph 11 of JIS K6400.

In the cavity 4, there exists water (moisture) included in the air in many cases. Thus, ether polyurethane sponge which is strong for hydrolytic degradation is preferable as the porous material. It is preferable that the porous material has repellency and mildewproof. In order to prevent toxic gas from being generated when the tire is incinerated, it is preferable that the porous material does not contain halogen atom.

Figure 6:
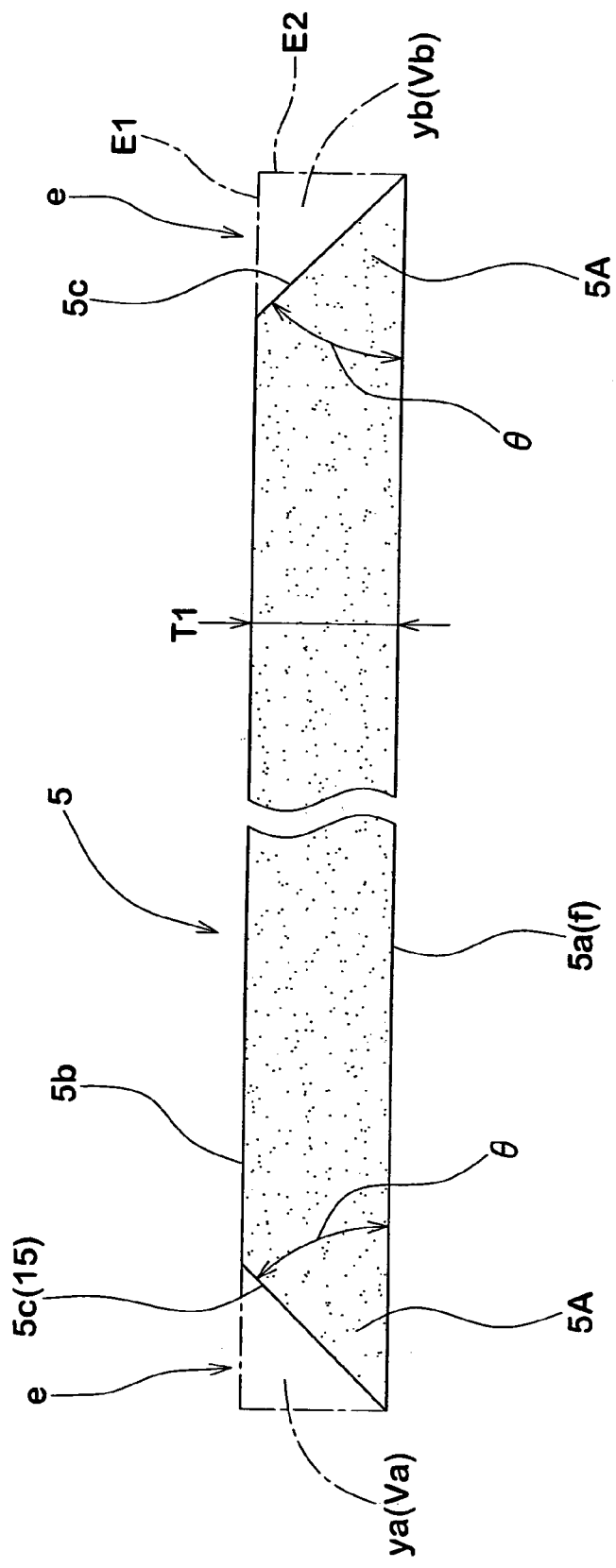
FIG. 6 is a side view showing one example of an inclined surface in an outer end of the noise damper in the circumferential direction.

In order to more reliably suppress the generation of the damage (g) in the noise damper 5, it is preferable that at least one of ends (e) thereof in the circumferential direction of the tire is provided with a tapered portion 5A. FIG. 6 is a side view of the noise damper 5 developed straightly. In the noise damper 5 of this embodiment, a rod having opposite ends e, e is curved in a form of an arc and the rod is fixed to the cavity 4. Both the ends e, e are provided with the tapered portions 5A.

In this example, the height T1 of the tapered portion 5A in the radial direction of the tire is gradually reduced toward its end. The tapered portion 5A includes a bottom surface 5a fixed to the tire 2 (or the wheel rim 3), and an inclined surface 5c intersecting with the bottom surface 5a at an acute angle. The tapered portion 5A enables a mass reduced of the end of the noise damper 5. Therefore, the stress acting on the adhesion surface (f) of the end (e) is made small so that the cracking damage (g) is more reliably prevented. Preferably, the angle θ formed between the bottom surface 5a and the inclined surface 5c of the tapered portion 5A is in a range of from 15 to 70°.

The tapered portion 5A defines a phantom prism portions ya and yb surrounded by an elongation surface E1 of an upper surface 5b of the noise damper 5, a vertical surface E2 extending from the tip end of the inclined surface 5c perpendicularly to the bottom surface 5a, the inclined surface 5c and a pair of side surfaces 5f. It is preferable that volumes Va and Vb of the phantom prism portions ya and yb and the volume V2 of the noise damper satisfy the following relation:

$$0.08 \leq (Va+Vb)/(V2+Va+Vb) \leq 0.10$$

Figure 7A:
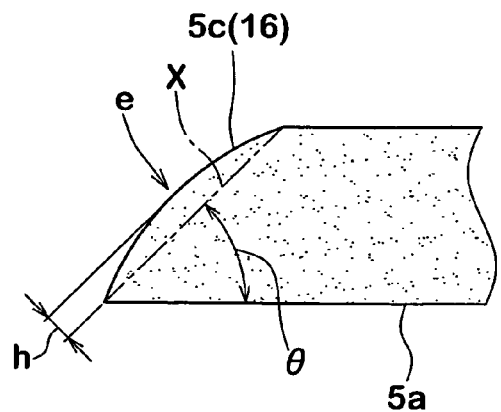
FIGS. 7 (A) and (B) are side views showing another example of the inclined surface, and (C) and (D) are a perspective view and a plan view, respectively, showing another example of the tapered portion.
Figure 7B:
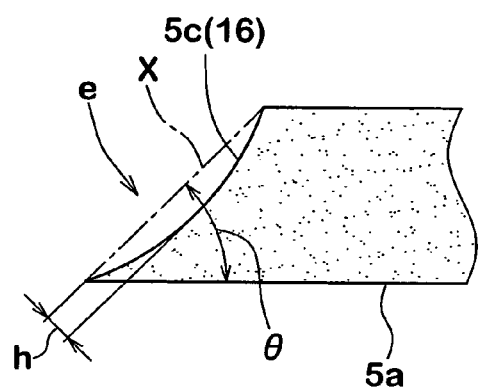

In the tapered portion 5A, the inclined surface 5c is formed of substantially flat surface 15 in view of productivity. As shown in FIGS. 7(A) and (B), however, the inclined surface 5c may be formed of a curved surface 16 having an arc surface or a spherical surface projecting in a convex manner or concave manner. At that time, an angle θ formed between the bottom surface 5a and a straight line X connecting upper and lower ends of the curved surface 16 to each other is in a range of from 15 to 70°. The maximum separation distance h from the straight line X of the curved surface 16 is preferably 10 mm or less.

Figure 7C:
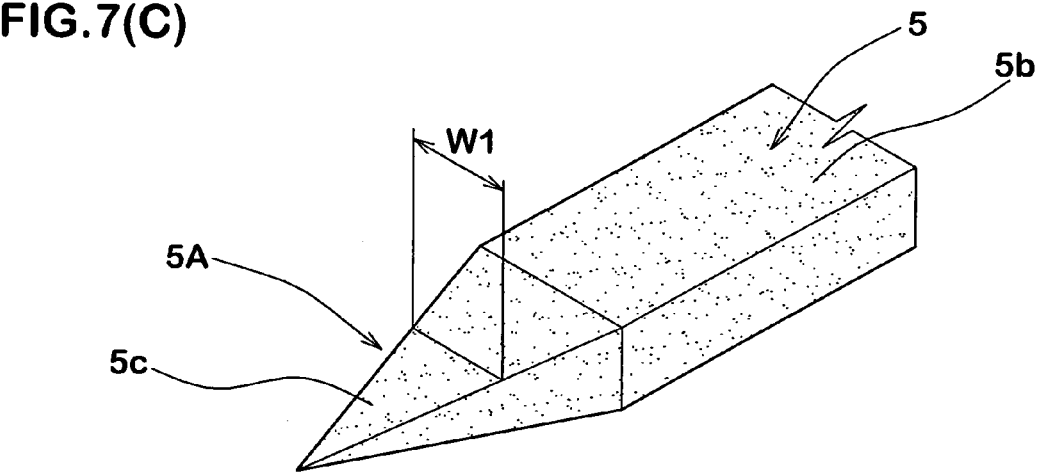
Figure 7D:
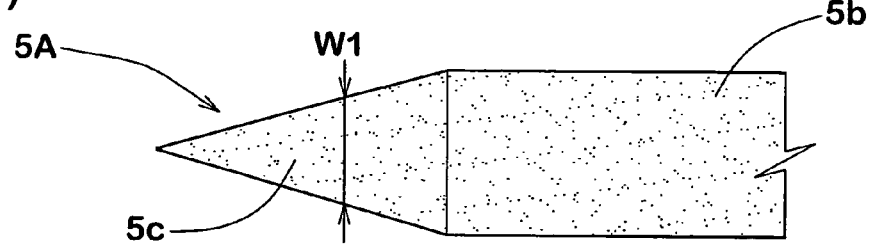

FIGS. 7(C) and (D) show another embodiment of the present invention. In this embodiment, the width W1 of the tapered portion 5A of the noise damper 5 in the axial direction of the tire is gradually reduced toward its end. Preferably, the height T1 of the tapered portion 5A in the radial direction of the tire is also gradually reduced.

Although the preferred embodiments of the present invention have been described in detail, the invention is not limited to the illustrated embodiments, and the invention can be variously modified.

Comparative Test 1

A tire noise reducing system using polyurethane noise damper described in Table 1 was prototyped, and durability and the road noise of the noise damper were tested. Specifications and test method are as follows.

Pneumatic Tire:
  195/65R15

Adhering Method Between the Tire and the Damper:
  The noise damper was adhered to a tread region of the inner surface of the tire using a double-sided tape. The tread region does not have discharging groove of the bladders.

Cross Section Shape of Noise Damper:
  Height T1=5 cm
  Width W1=4 cm
  Length L1=185 cm
  volume V2: 3700 cm$^3$ Durability of Noise Damper (Smooth Road Surface):
  The tire noise reducing system was allowed to run on a drum tester (diameter was 1.7 m) under the following conditions, and when the tire noise reducing system run through 6,000 km and 12,000 km, presence or absence of cracking damage in the outer end of the noise damper in the circumferential direction was checked.
  Internal pressure: 200 kPa
  Load: 6.5 kN (1.2 times the maximum value defined in JATMA)
  Speed: 80 km/h Road Noise:
  The tire noise reducing systems were mounted to all wheels of a Japanese 2,000 cc FF vehicle, the vehicle was allowed to run at 60 km/h on a road noise measuring road, and a noise in the vehicle was measured at an ear position on a driver's seat on the side of a window. A sound pressure level of a peak value of resonance around 240 Hz was measured. A result is indicated as a variation value while taking the embodiment A5 as a reference. Here, 0 (zero) means that this is equal to the reference, and + (plus) means that the road noise is increased.

TABLE 1

| | Embodiment A1 | Embodiment A2 | Embodiment A3 | Embodiment A4 | Embodiment A5 | Comparative example A1 | Comparative example A2 | Comparative example A3 | Comparative example A4 | Comparative example A5 | Comparative example A6 | Comparative example A7 |
|---|---|---|---|---|---|---|---|---|---|---|---|---|
| Damper | | | | | | | | | | | | |
| Volume ratio V2/V1 (%) | 10.3 | 10.3 | 10.3 | 10.3 | 10.3 | 10.3 | 10.3 | 10.3 | 10.3 | 10.3 | 10.3 | 10.3 |
| Presence or absence of tapered portion | Absence | Absence | Absence | Absence | Absence | Absence | Absence | Absence | Absence | Absence | Absence | Absence |
| (Company of product) | *1 | *2 | *2 | *3 | *4 | *2 | *2 | *2 | *4 | *3 | *3 | *1 |
| (Model) | EY | EFS | ER-14 | 300S | E16 | EL-69 | EPH-30 | ESH | NE28 | 301K | 333H | PD |
| Specific gravity | 0.017 | 0.021 | 0.025 | 0.019 | 0.016 | 0.035 | 0.030 | 0.044 | 0.025 | 0.019 | 0.023 | 0.025 |
| Hardness (N) | 50 | 20 | 50 | 60 | 80 | 90 | 250 | 140 | 110 | 120 | 170 | 130 |
| Tensile strength (KPa) | 80 | 110 | 90 | 100 | 80 | 150 | 160 | 120 | 110 | 110 | 160 | 140 |
| Elongation (%) | 280 | 430 | 320 | 370 | 200 | 490 | 140 | 220 | 210 | 270 | 240 | 210 |
| Tear strength (N/cm) | 5.6 | 7.1 | 5.2 | 6.3 | 5.3 | 8.9 | 9.3 | 7.7 | 6.1 | 7.4 | 9.0 | 7.8 |
| Presence or absence of cracking damage | | | | | | | | | | | | |
| When the vehicle runs through 6,000 km | Absence | Absence | Absence | Absence | Absence | Presence | Presence | Presence | Presence | Presence | Presence | Presence |
| When the vehicle runs through 12,000 km | Absence | Absence | Absence | Presence | Presence | — | — | — | — | — | — | — |
| Road noise (dB) | 0 | -1 | 0 | 0 | 0 | 0 | 0 | 0 | 0 | 0 | 0 | 0 |

*1 Achilles Corporation
*2 Inoac Corporation
*3 Kurabo Industries Ltd.
*4 Marusuzu Co., Ltd.

As shown in Table 1, it was confirmed that in the systems of the embodiments, the road noise reducing effect was secured and the durability of the noise damper was enhanced.

Comparative Test 2

Polyurethane noise dampers having the same physical properties as those of the embodiment A5 were prototyped according to the specifications shown in Tables 2 and 3, and tire noise reducing systems were prototyped using these noise dampers. The vehicle was allowed to run on a stepped road and durability and road noise of the noise damper were tested. The test method is as follows.

Durability of the Noise Damper on the Stepped Road:

The tire noise reducing systems were allowed to run on a drum having projections (diameter was 1.7 m) under the following conditions, and a distance through which the tire noise reducing systems run until the cracking damage was generated. The full distance was 10,000 km. The drum was provided on its two locations on its circumference with projections having trapezoidal cross sections of 15 mm height×40 mm lower bottom×20 mm upper bottom.

Internal pressure: 200 kPa
Load: 6.5 kN (1.2 times the maximum value defined in JATMA)
Speed: 60 km/h Road Noise:

The road noise was measured in the same manner. A result was compared with embodiments B1 and C1 as references.

TABLE 2

|  | Embodiment B1 | Embodiment B2 | Embodiment B3 | Embodiment B4 | Embodiment B5 | Embodiment B6 | Embodiment B7 | Embodiment B8 | Embodiment B9 |
|---|---|---|---|---|---|---|---|---|---|
| Damper |  |  |  |  |  |  |  |  |  |
| Volume V2 ($cm^3$) | 3885 | 3874 | 3862 | 3849 | 3822 | 3776 | 3650 | 3528 | 3165 |
| Volume ratio V2/V2 (%) | 10.8 | 10.8 | 10.8 | 10.7 | 10.6 | 10.5 | 10.2 | 9.8 | 8.8 |
| Tapered portion | Absence | Presence | Presence | Presence | Presence | Presence | Presence | Presence | Presence |
| Angle θ (°) | 90 | 80 | 70 | 60 | 45 | 30 | 15 | 10 | 5 |
| Volume Va + Vb of phantom prism portion ($cm^3$) | 0 | 11.2 | 23.0 | 36.4 | 63.0 | 109.2 | 235.2 | 357.2 | 720.0 |
| Ratio (Va + Vb)/(V2 + Va + Vb) (%) | 0 | 0.3 | 0.6 | 0.9 | 1.6 | 2.8 | 6.1 | 9.2 | 18.5 |
| Distance through which the vehicle run until cracking damage was generated (km) | 2000 | 3000 | 8000 | 10000 | 10000 | 10000 | 10000 | 10000 | 10000 |
| Road noise (dB) | 0 | 0 | 0 | 0 | 0 | +0.1 | +0.4 | +0.9 | +2.0 |

\* Height T1 (3 cm), width W1 (7 cm) and length L1 (185 cm) of damper

TABLE 3

|  | Embodiment C1 | Embodiment C2 | Embodiment C3 | Embodiment C4 | Embodiment C5 | Embodiment C6 | Embodiment C7 | Embodiment C8 | Embodiment C9 |
|---|---|---|---|---|---|---|---|---|---|
| Damper |  |  |  |  |  |  |  |  |  |
| Volume V2 ($cm^3$) | 3700 | 3682 | 3664 | 3642 | 3600 | 3527 | 3327 | 3133 | 2557 |
| Volume ratio V2/V2 (%) | 10.3 | 10.2 | 10.2 | 10.1 | 10.0 | 9.8 | 9.3 | 8.7 | 7.1 |
| Tapered portion | Absence | Presence | Presence | Presence | Presence | Presence | Presence | Presence | Presence |
| Angle θ (°) | 90 | 80 | 70 | 60 | 45 | 30 | 15 | 10 | 5 |
| Volume Va + Vb of phantom prism portion ($cm^3$) | 0 | 17.6 | 36.4 | 57.8 | 100.0 | 173.2 | 373.2 | 567.2 | 1143.0 |
| Ratio (Va + Vb)/(V2 + Va + Vb) (%) | 0 | 0.5 | 1.0 | 1.6 | 2.7 | 4.7 | 10.1 | 15.3 | 30.9 |
| Distance through which the vehicle run until cracking damage was generated (km) | 200 | 400 | 600 | 600 | 3000 | 7000 | 10000 | 10000 | 10000 |
| Road noise (dB) | 0 | 0 | 0 | 0 | +0.1 | +0.4 | +1.1 | +2.1 | +3.5 |

\* Height T1 (5 cm), width W1 (4 cm) and length L1 (185 cm) of damper

As shown in Tables 2 and 3, in the noise dampers having tapered portion angle of 70° or lower, the durability is further enhanced. At that time, it can be found that the preferable angle is 15° or greater, and more preferably 30° or greater.

What is claimed is:
1. A pneumatic tire comprising:
   a tread portion,
   a pair of bead portions,
   a pair of sidewall portions extending between the tread portion and the bead portions, and
   a noise damper fixed to an inner surface of the tread portion, wherein
   the noise damper is made of porous material having a hardness of from 10 to 80 N, a tensile strength of not less than 70 kPa and a specific gravity of from 0.014 to 0.026,
   the noise damper extends in a circumferential direction of the tire, and
   a tapered portion is formed on at least one of ends of the noise damper in the circumferential direction of the tire.
2. The pneumatic tire according to claim 1, wherein the height of the tapered portion is gradually reduced in a radial direction of the tire.
3. The pneumatic tire according to claim 2, wherein the tapered portion includes a bottom surface fixed to an inner surface of the tread portion and an inclined surface having an acute angle with respect to the bottom surface.
4. The pneumatic tire according to claim 3, wherein the acute angle θ formed between the bottom surface and the inclined surface is from 15 to 70°.
5. The pneumatic tire according to any one of claims 1, 2, 3 or 4, wherein the width of the tapered portion is gradually reduced in an axial direction of the tire.

6. The pneumatic tire according to claim 1, wherein the porous material has a hardness of from 20 to 50 N.

7. The pneumatic tire according to claim 1, wherein the porous material has a tensile strength of from 80 to 160 kPa.

8. The pneumatic tire according to claim 1, wherein the porous material has a tensile strength of from 80 to 120 kPa.

9. The pneumatic tire according to claim 1, wherein the porous material has an elongation of from 200 to 600%.

10. The pneumatic tire according to claim 1, wherein the porous material has a tear strength of from 5 to 10 N/cm.

* * * * *